United States Patent [19]

Krauss

[11] Patent Number: 4,622,723
[45] Date of Patent: Nov. 18, 1986

[54] CORD LOCK
[75] Inventor: Mark J. Krauss, Forest Hills, N.Y.
[73] Assignee: American Cord & Webbing Co., Inc., New York, N.Y.
[21] Appl. No.: 712,882
[22] Filed: Mar. 18, 1985
[51] Int. Cl.[4] .......................................... F16G 11/00
[52] U.S. Cl. ............................... 24/115 G; 24/136 R
[58] Field of Search ............ 24/115 G, 115 R, 136 R, 24/266, 118, 616, 557; 339/203, 255 R, 255 L; 312/115 G

[56] References Cited

U.S. PATENT DOCUMENTS

| | | |
|---|---|---|
| 2,293,719 | 8/1942 | Eby . |
| 2,524,649 | 10/1950 | Buhler . |
| 2,645,832 | 7/1953 | Lee ....................... 24/115 G |
| 2,753,653 | 7/1956 | Osterberg ................. 24/115 G |
| 3,080,867 | 3/1963 | Eichinger ................. 339/255 L |
| 3,123,182 | 3/1964 | Malone et al. ............ 24/115 G |
| 3,251,110 | 5/1966 | Hedu ........................ 24/616 |
| 3,360,836 | 1/1968 | Geldwerth ................. 24/616 |
| 4,170,809 | 10/1979 | Geldwerth et al. ......... 24/616 |
| 4,188,686 | 2/1980 | Baum ...................... 24/115 G |
| 4,277,864 | 7/1981 | Orson, Sr. ................. 24/557 |
| 4,288,891 | 9/1981 | Boden . |
| 4,328,605 | 5/1982 | Hutchison et al. ........... 24/136 R |
| 4,426,854 | 1/1984 | Geldwerth et al. ........... 24/616 |
| 4,453,292 | 6/1984 | Bakker ..................... 24/115 G |

FOREIGN PATENT DOCUMENTS

| | | | |
|---|---|---|---|
| 2451175 | 11/1980 | France ..................... 24/616 |
| 70432 | 4/1928 | Sweden . |
| 125030 | 5/1946 | Sweden . |
| 307411 | 5/1955 | Switzerland .............. 24/616 |
| 2066891 | 7/1981 | United Kingdom . |
| 2131868 | 6/1984 | United Kingdom ......... 24/136 R |

Primary Examiner—Victor N. Sakran
Attorney, Agent, or Firm—Marvin Feldman

[57] ABSTRACT

A molded plastic cord lock is formed of a molded generally rectilinear housing having a recess, and transverse through holes in the sides of the housing; and a molded insert having an integral plunger portion and W-shaped spring portion to be slidably received in the housing recess. The plunger has a through hole which is coincident with the housing side through holes with the plunger depressed and the spring compressed for receiving a cord to be locked between the plunger and the housing. Stop elements are formed on the plunger to snap fit into the respective housing through holes.

9 Claims, 7 Drawing Figures

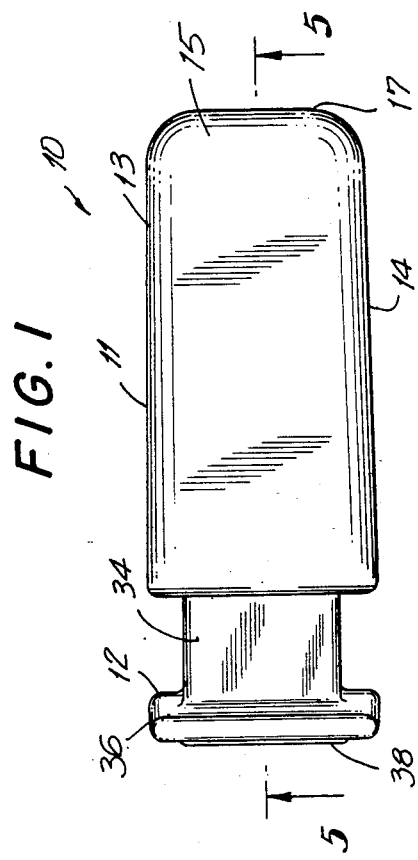
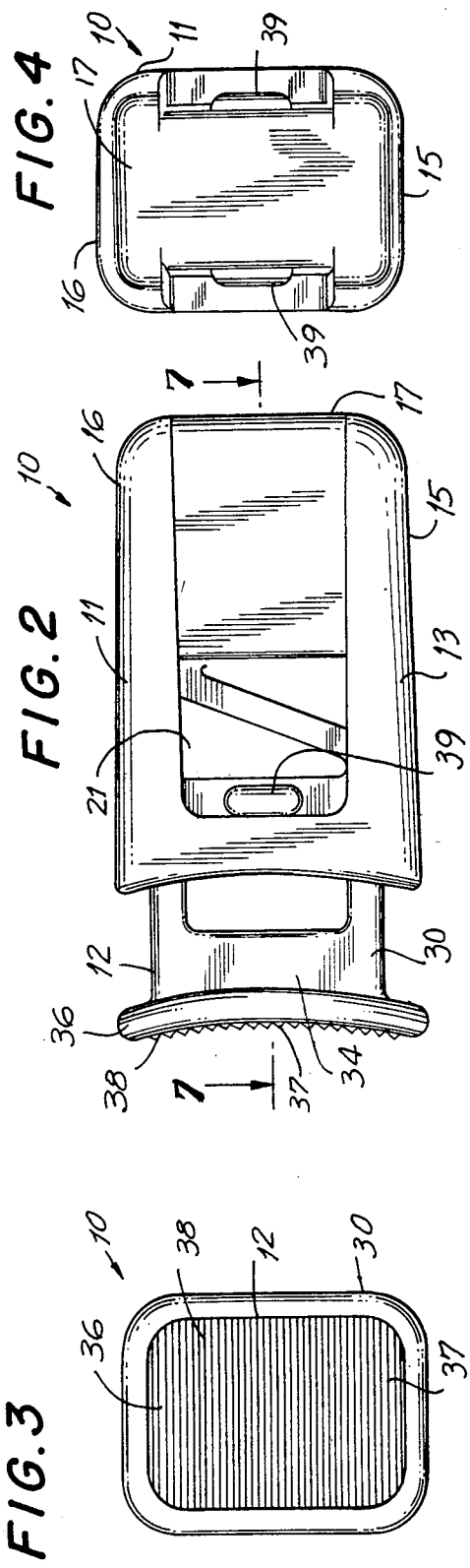
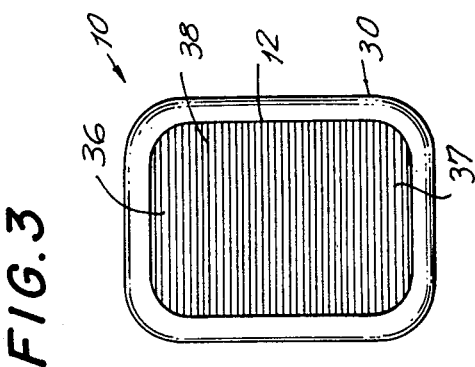

CORD LOCK

FIELD OF THE INVENTION

This invention relates to a cord lock.

BACKGROUND AND DISCUSSION OF THE PRIOR ART

It is known in the cord lock art to provide a helicoidal metal spring in a cylindrical housing with a plunger slidably disposed in the housing, and the cylindrical housing having holes which are made coincident with a plunger hole to receive a cord, which cord is locked in place between the plunger and housing when the spring expands. Typical of such prior art cord locks are those disclosed in Swedish Patent No. 70432, granted Apr. 5, 1982; Swedish Patent No. 125,030, patented May 16, 1946; and Hutchison et al., U.S. Pat. No. 4,328,605, granted May 11, 1982.

Other more elaborate cord locks or clamps are disclosed in Eby, U.S. Pat. Nos. 2,293,719, granted Aug. 25, 1942; Buhler, 2,524,649, granted Oct. 3, 1950; Eichinger, 3,080,867, granted Mar. 12, 1963; Boden, 4,288,891, granted Sept. 15, 1981; and U.K. Patent Application GB No. 2 066 891, filed July 15, 1981.

Such prior art constructions involved three or more elements which had to be properly shaped and interfitted for proper use. In addition, the prior art often required separate stop and hole alignment elements to insure ready functioning of the lock.

Now there is provided by the present invention a cord lock which requires only two molded parts which are readily interfitted and yet provide a smoothly functioning, reliable design.

SUMMARY OF THE INVENTION

A cord lock being a molded housing member forming a rectilinear closed bottom recess, and a one-piece molded insert being a plunger portion and an integral spring portion being received in the recess. Opposing housing sides are formed with through holes and the plunger is formed with a through hole which are made coincident with depression of the plunger and compression of the spring portion. Stop elements are formed on the plunger to snap fit into the respective housing side holes.

BRIEF DESCRIPTION OF THE DRAWINGS

FIG. 1 is an end elevational view of the cord lock of the present invention;

FIG. 2 is a side elevational view of the cord lock;

FIG. 3 is a top plan view of the cord lock;

FIG. 4 is a bottom plan view of the cord lock;

DESCRIPTION OF THE PREFERRED EMBODIMENTS

Figure 6:
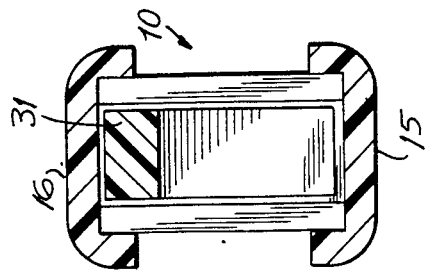
FIG. 6 is a sectional view taken along line 6—6 of FIG. 5.
Figure 5:
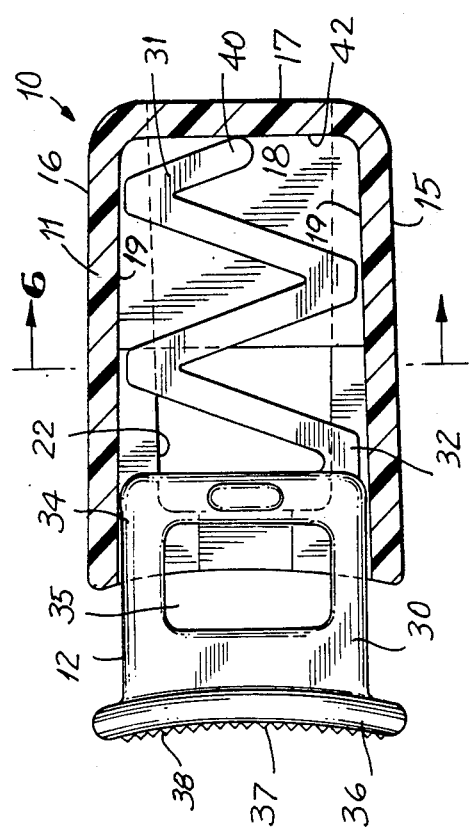
FIG. 5 is a sectional view taken along line 5—5 of FIG. 1.
Figure 7:
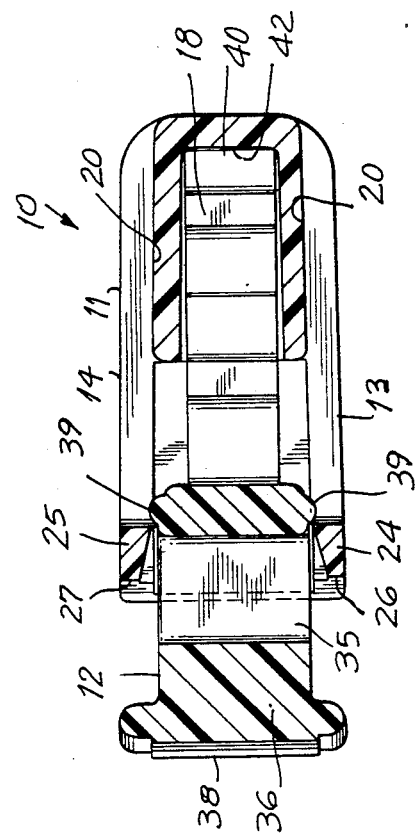
FIG. 7 is a sectional view taken along line 7—7 of FIG. 2.

Referring to the FIGURES, there is shown the cord lock of the present invention generally referred to as 10. Cord lock 10 is formed of two principal members, namely, generally rectilinear housing 11 and insert 12. Housing 11 is formed of opposing side walls 13 and 14, opposing end walls 15 and 16 and bottom wall 17 to form recess 18. The interior portions of walls 13-16 are tapered as at 19 and 20. Opposing coincident through holes 21 and 22 are formed in walls 13 and 14 respectively for purposes hereinafter appearing. Parallel opposed tapered walls 24 and 25 are provided at the top edges 26 and 27 of side walls 13 and 14 respectively, for purposes hereinafter appearing.

Insert 12 is formed of a plunger portion 30 and a W-shaped portion or spring 31 integrally molded thereto at bottom end 32 of plunger portion 30. Plunger portion 30 has a block or body 34 formed with generally rectangular through hole 35. An outwardly extending finger engaging portion 36 is formed at the top of body 34. Portion 36 is arcuately curved so as to form concave surface 37, which is provided with a plurality of parallel ridges 38 for engaging the thumb of the user. A pair of outwardly extending elements or ears 39 are formed on body 34 which ears slidably engage walls 24 and 25 to snap fit into through holes 21 and 22 so as to serve as stop features to hold the insert in the housing.

Spring 31 is formed as a W-shape with one leg being formed with the body at 32, while the other shorter leg 40 forming a free-end of insert 12. The bottom edge 41 of leg 40 contactingly engages the inside 42 of bottom wall 17. It is to be noted that the spring 31 is of generally rectangular cross-sectioned as well as encompassing an overall rectilinear space so as to closely fit within tapered recess 18.

In the aforesaid manner of construction, the user places a thumb on finger engaging portion 36, and depresses the plunger portion 30 into the recess 18 so as to cause spring 31 to compress. With such compression, insert through hole 35 is made coincident with housing through holes 21 and 22, so that a cord or a plurality of cords may be passed through holes 21, 35 and 22. The user then releases the plunger 30 and the spring 31 expands to hold the cord between the plunger 30 and housing 11.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

What is claimed is:

1. A cord lock comprising: a housing comprising opposing sides and a bottom so as to form a recess, and being formed with through holes on said opposing sides; and an insert being formed so as to be slidably received in said recess, said insert comprising a plunger portion and an integral spring portion disposed at the end thereof, said plunger portion being formed with a transversely disposed through hole, whereby when the plunger is despressed, the spring compresses so that the plunger hole aligns with the holes on the housing sides so as to receive a cord, and with release of the plunger the spring expands to lock the cord between the plunger portion and the housing, said plunger portion further comprising a pair of oppositely disposed ears, having rounded portions and extending outwardly from said plunger portion, said ears being rigid, and said housing being formed with a tapered portion to receive the ears in a snap fit between the rounded portions and the plunger portion and within the respective housing through holes, said recess being about rectilinear, and said spring being rectilinear to be received in said recess and with the rounded portions of the ears extending outwardly from the housing portion in which the spring is received.

2. The cord lock of claim 1, said spring being formed with and extending from the plunger portion at one side of the plunger portion.

3. The cord lock of claim 2, said housing sides being shaped so that the recess is about rectilinear, and said spring portion being rectilinear and being received within the recess.

4. The cord lock of claim 3, said spring portion being W-shaped.

5. The cord lock of claim 4, said spring portion and said plunger portion being formed of the same plastic.

6. The cord lock of claim 5, all said holes being about rectilinear in shape.

7. The cord lock of claim 1, said ears being integral with said plunger and being disposed between the plunger hole and the spring portion.

8. The cord lock of claim 1, said plunger being formed with a finger engaging end portion oppositely disposed from the spring portion end, said finger engaging portion being concave, and a plurality of ridges being formed in the concave portion.

9. The cord lock of claim 1, said spring being W-shaped with one leg of the W being integrally formed with the plunger and the other leg forming a free end and being shorter than said one leg.

* * * * *